HERBERT O. CORBETT
INVENTOR.

BY Lawrence Rosen

HERBERT O. CORBETT
INVENTOR.

BY Lawrence Rosen

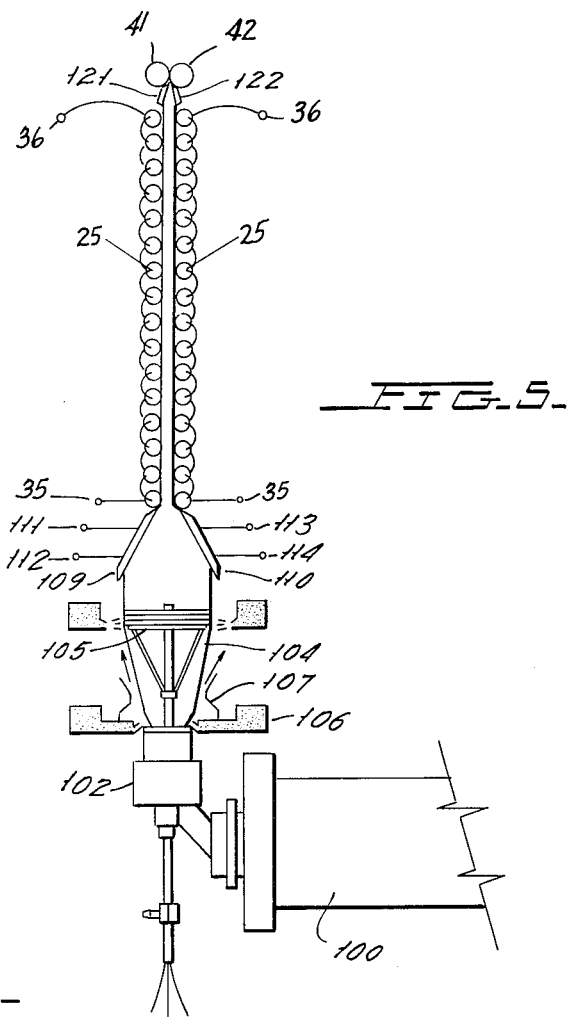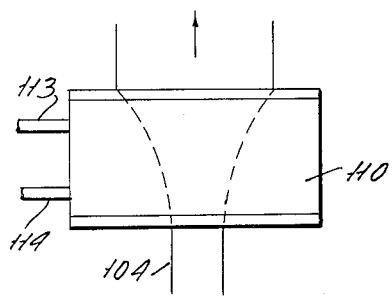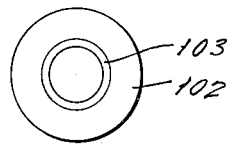

United States Patent Office 3,221,370
Patented Dec. 7, 1965

3,221,370
APPARATUS FOR EXTRUDING THERMO-
PLASTIC FILM
Herbert O. Corbett, Cananadaigua, N.Y., assignor to
National Distillers and Chemical Corporation, New
York, N.Y., a corporation of Virginia
Filed Feb. 6, 1963, Ser. No. 256,619
12 Claims. (Cl. 18—14)

This application is a continuation-in-part of copending application Serial No. 144,253, filed October 10, 1961, and entitled "Extruded Thermoplastic Films and Method and Apparatus for Producing Same."

The present invention relates to an apparatus for forming tubular films of thermoplastic materials, and particularly to apparatus wherein the tubular film is formed in a substantially lay-flat condition, as compared with the conventional cylindrical form of apparatus of the prior art. The invention especially relates to an apparatus wherein a thermoplastic material is extruded from a generally rectangular die comprising a pair of longitudinally opposed die lips, spaced from and separated from each other by an intervening die lip element adapted to introduce a stream of gaseous material internally of the film tube whereby to cool, separate, and set the extruded film layers.

In addition, the invention relates to a film cooling system which provides for indirect heat exchange between extruded tubular film, produced either in a substantially lay-flat condition, or in a cylindrical form, and a fluid heat exchange material.

In the prior art, tubular film forms have been extruded by means of a circular die. Because of the film form produced, difficulty has been experienced in controlling the diameter of the finished product. Also, and by reason of the circular form of the die film product, adequate external cooling means primarily have been limited to the use of circularly formed means for discharge of gaseous cooling materials. Cooling and setting of the formed film by means of liquid cooled metal surfaces, as employed in the forming of sheet extruded thermoplastics, has been denied to the production of tubular films, by reason of the necessity to maintain a cylindrical form of the film in the immediate vicinity of the circular extrusion die in order to avoid distortion and rupture of the incompletely set molten film material.

It is an object of the present invention to provide an apparatus for the production of a tubular film web from thermoplastic materials wherein the web is extruded as two spaced web layers integrally united along opposite longitudinal edge portions during the extrusion operation. It is also an object of the present invention to provide a method and apparatus whereby the internally opposed surfaces of the "lay-flat" web layers formed in the manner disclosed may be cooled by an air stream introduced between them, and simultaneously held in a spaced apart relationship while the layered film web is cooled and set. It is a further object of the invention to provide means for extruding and forming a lay-flat tubular film web of the character disclosed, wherein the web as formed may be maintained in substantially continuous surface contact with metallic chill rolls during any desired period, whereby to quench and set the film. Still further objects of the present invention are to provide a die structure particularly adapted to the method contemplated, and a chill roll structure cooperatively related to said die structure, and adapted for indirect heat exchange quenching of the tubular film web formed by such a die structure.

Another object of the invention is to provide a chill train system adapted for indirect heat exchange between a tubular film and a fluid heat exchange material by means of including paired series of roller elements arranged in opposed parallel relationship wherein each pair of opposed rollers are disposed with their axes in a common plane which is at right angles to the travel path of such film passed between the paired series of elements.

Yet another object of the invention is to provide a novel roll structure adapted to cooperate with an extrusion die structure whereby to permit indirect heat exchange quenching of a tubular film web discharged from said die structure. A heat exchange film circulated through such rolls provides for heat transfer from or to the film as desired. A preferred use is as a "chill train" with heat transfer from the film.

The invention and its objects may be more fully understood from the following description, especially when read with reference to the accompanying drawings, of which:

FIG. 5 is a side elevational view, illustrating the employment of the chill train structure, according to FIG. 1, in combination with a circular die of generally conventional form.

FIG. 6 is a plan view indicating the circular orifice of the die shown in FIG. 5, and FIG. 7 is a side elevation of a deflector shield element as illustrated by FIG. 5.

Figure 1:
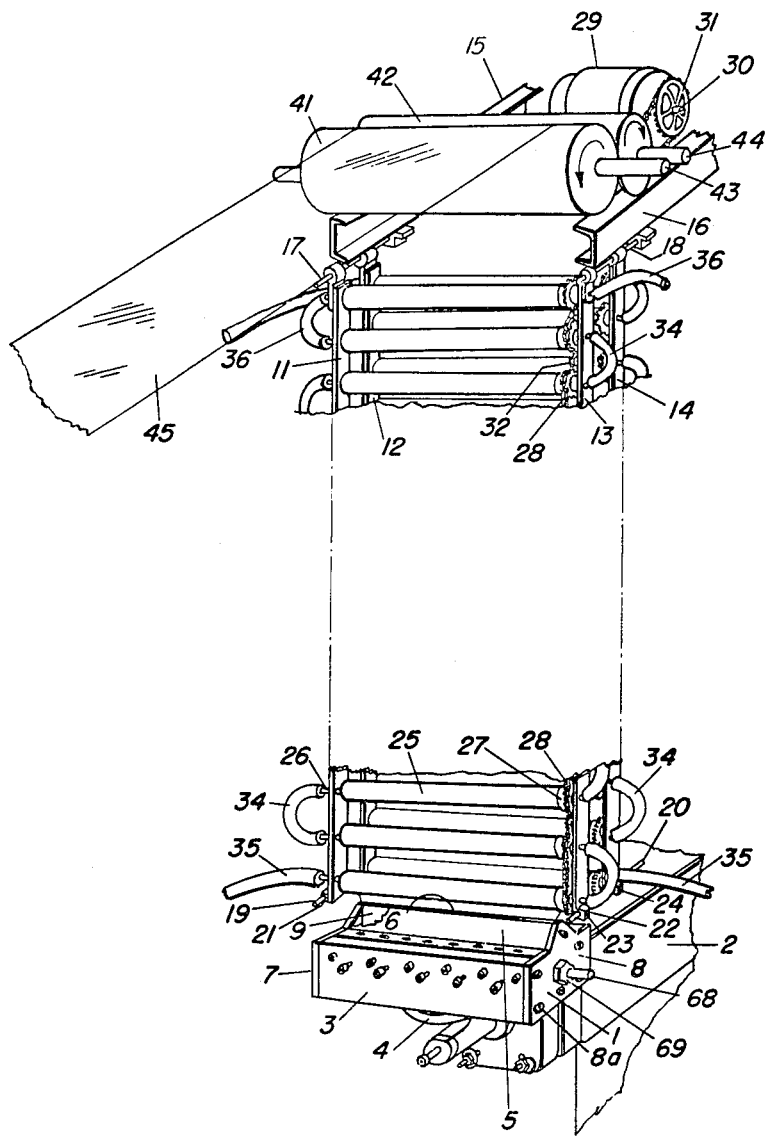
FIG. 1 is a fragmentary view in perspective of an extrusion system according to the present invention, with parts broken away to show internal elements and/or parts otherwise concealed from view.
Figure 2:
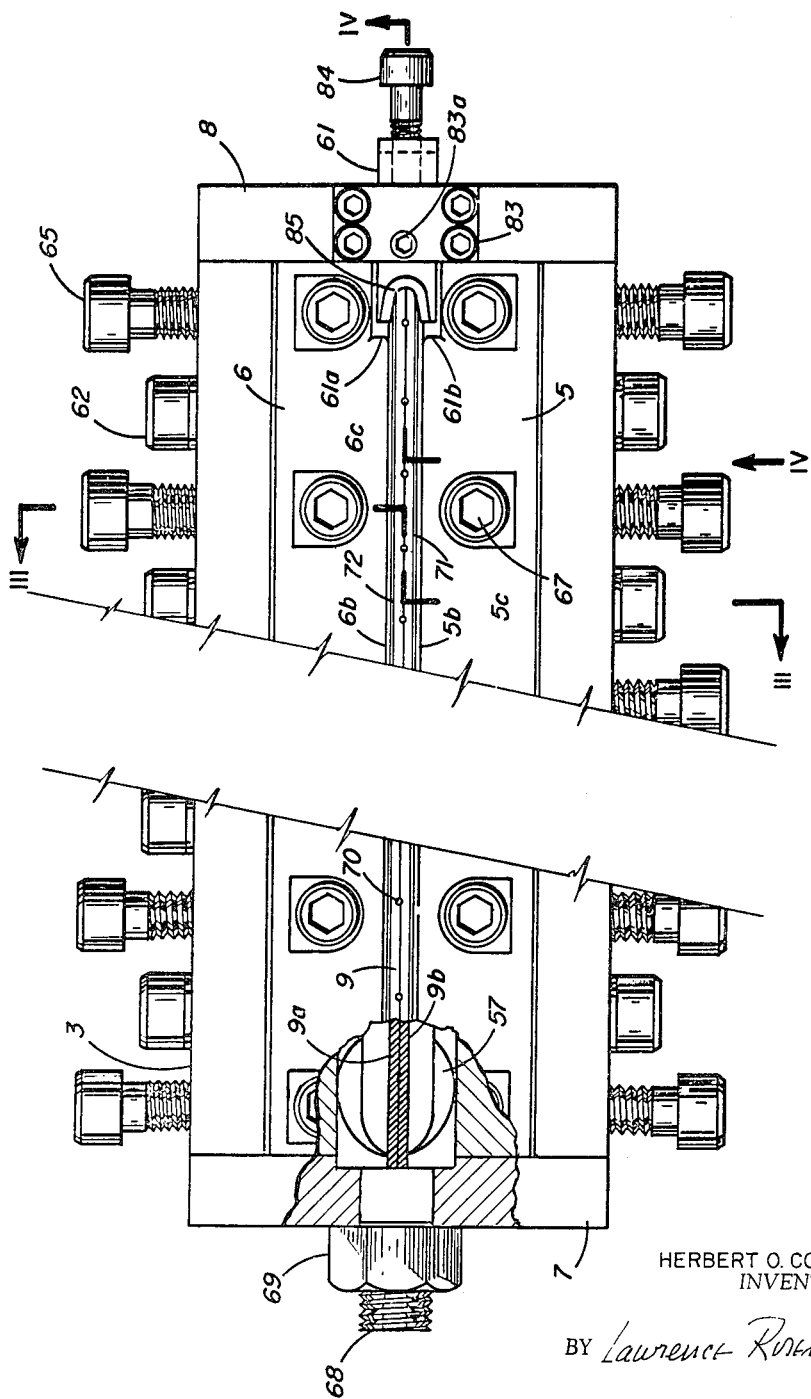
FIG. 2 is a fragmentary plan view of the extruder head illustrated, in FIG. 1 with a part of one end broken away substantially as in FIG. 1.

Referring now to the several drawings, wherein like parts are uniformly designated by the same numerals, an assembled extrusion system is shown in FIG. 1. This system generally comprises an extruder head 1 mounted on an extruder barrel 2 so as to direct the die orifice upwardly.

Immediately above the die head is a roller frame "chill train" structure which includes two pairs of vertical side rail members designated in pairs by the numerals 11 and 13, and 12 and 14 respectively. These side rails are supported by and suspended from a spaced pair of support beams 15 and 16 as by means of hanger rods 17 and 18. The rod 17 provides support for the side rails 11 and 12, and the rod 18 for the rails 13 and 14. Preferably, the rails in opposite relation are supported for selective movement longitudinally of the hanger rods, whereby to provide for adjusted spacing of the rail pairs. To maintain the roller frames fixed in any selected spacing relationship, the lower ends of opposite rail members are connected by rods 19 and 20 passed through collars indicated at 21 and 22 to be held therein as by means of set screws indicated at 23 and 24.

Each pair of rails is adapted to support a series of parallel hollow metal rollers 25 supported transversely between the rails on hollow shafts 26 extended outwardly through suitable bearings in the rails. Each such shaft carries a sprocket 27 fixed to the shaft sprocket, as shown, is disposed intermediate the roller and the inner face of an adjoining rail. These sprockets, and thereby the rollers, are driven by means of a sprocket chain 28, and a motor 29 mounted on the beam 16. The motor shaft 30 mounts a drive sprocket 31 engaged by the chain 28.

As shown, in order to obtain uniform rotation of the rollers in an upward direction the shaft sprockets in one series are engaged by the chain over their outer aspects, while in the other series of shaft sprockets the chain engages them over their inner aspects. Also, in order to maintain engagement between chain and sprockets, idler sprockets, designated by the numeral 32 are mounted on the rails 13 and 14 at several points intermediate pairs of roller shaft sprockets in the manner shown. An idler roll or rollers at the lower ends of the side rails 12 and 14 (not shown), may provide for passing the chain 28 from one roller frame to the other.

Each series of rollers supported between the respective pairs of rail members, is connected through their hollow shafts by means such as conduits 34, whereby to provide for circulation of a heat exchange fluid through the roller series upwardly from the lowermost roller to the uppermost. An inlet conduit 35 provides for introduction of the heat exchange fluid into the lowermost roller, while an outlet conduit 36 provides for discharge of the fluid from the uppermost roller.

The roller frame structure illustrated and described with reference to FIG. 1, is representative of a mechanical system for accomplishment of the method contemplated according to the present invention. Comparable systems, which include at least two vertical series of horizontal rolls, disposed in opposed spaced relation substantially to define an elongated, relatively narrow travel path between the rolls, and wherein the axes of two opposed rolls in the respective series are disposed in a common plane right angularly related to such travel path, and surfaces of a tube-type, thermoplastic film web extruded and drawn along said path in outer surface contact with said rolls, also may be employed. The arrangement illustrated, wherein said vertical rail frame members supporting the horizontal rolls are hinge supported at their upper ends, may be modified to provide other means for variably spacing the frame members. Also other roll drive means, including gear and belt drive means may be provided without departing from the inventive concepts set forth.

The numerals 41 and 42 designate a pair of nip rolls disposed immediately above and in transverse relation to the beams 15 and 16. The rolls 41 and 42 may be supported on the beams by bearing brackets (not shown) adapted to receive the roll shafts 43 and 44 respectively. The roll 41 and shaft 43 preferably are hollow metal elements adapted for circulation of a heat exchange fluid therethrough. The roll 42 preferably is coated or covered with a resilient material such as rubber, neoprene, or another material having a relatively high coefficient of friction relative to the thermoplastic material worked on.

These nip rolls 41 and 42 are well known in the art, and are intended to be driven, in the direction indicated by arrows, in any conventional fashion. In the structure illustrated, however, it is desired that they be mounted so that a line of relative tangency between the rolls be located in a vertical plane common to the longitudinal center line of the die orifice opening from the head 1. As illustrated in FIG. 1, the sheeted thermoplastic material, designated by the numeral 45, is extruded substantially along this plane and line to pass upwardly between the roller frames into engagement by the nip rolls.

The extruder head structure 1, as shown in FIGS. 1 to 4 inclusive, is generally composed of a body portion 3; an inlet nozzle 4; die lips 5 and 6; end cap plates 7 and 8; and an air blade 9.

In this structure, the body portion 3 and nozzle 4 cooperatively define an elongated inlet conduit 51 opening through the under side of the body into a generally cylindrical passageway 52 defined longitudinally of the body portion. The upper side of the body portion defines a recess 53 coextensive with the passageway 52, and centered on a line parallel to the longitudinal axis, with both line and axis lying in a common vertical plane. A vertical slotted portion 54 is defined in the body to communicate between the passageway and the recess, coextensively therewith on a radius of the passageway lying in the aforementioned plane. Each of the passageway, and the recess and slotted portions opens through the opposite ends of the body portion, but are normally closed by means of the cap plates 7 and 8, secured to the body portion ends as by means of cap screw bolts 8a particularly shown in FIG. 4.

Each cap plate 7 and 8 is provided to define a passageway 55 between inner and outer face portions, and a recess 56 in the inner face which extends radially upward from the inner end of the passageway 55 to the upper end of the plate. Also, as particularly shown in FIG. 4 the passageway 55 in each cap plate is extended from the inner face of the plate by means of a nipple 57. This nipple is fixedly secured in the passageway 55 at one end, as by welding. The other end, which extends beyond the plate face is cut at an angle so as to slope toward the plate in a plane common to a line along the plate surface intersecting the recess 56 in right angular relation thereto. In addition, the nipple is cut to provide a slotted portion 57a aligned with the opening into the recess 56 at its juncture with the passageway 55. The upper end, of each cap plate is notched to provide a recess 58 adapted to receive a deckle plate element 61.

The die lips, 5 and 6, are similar in that each is an elongated element provided for insertion in the body portion recess 53 to be coetensive therewith. Each die lip has a bottom surface fitted to the bottom of the recess, and opposite vertical wall portions of which the outer wall portions 5a and 6a have a height substantially equal to the depth of the recess 53, while the inner wall portions 5b and 6b are of a greater dimension, with the upper surfaces 5c and 6c angled upward therebetween. Each die lip has a thickness, or lateral dimension at its bottom surface which is appreciably less than half the width of the recess 53 and narrower than the distance between the edges of the slotted portion 54 and the inner wall surfaces of the recess 53.

At each end, each die lip is provided with flattened surface portions, such as designated by numerals 61a and 61b. These portions are substantially right triangular in cross section, being integral with the upper angular surface portions 5c and 6c respectively of the die lips 5 and 6, with the hypotenuse of the triangular sections based on the surface portions 5c and 6c. The flat upper surfaces of the portions 61a and 61b and the bottom of the recesses 58 are designed to lie in the same plane when the plates are affixed to the body portion ends.

Figure 3:
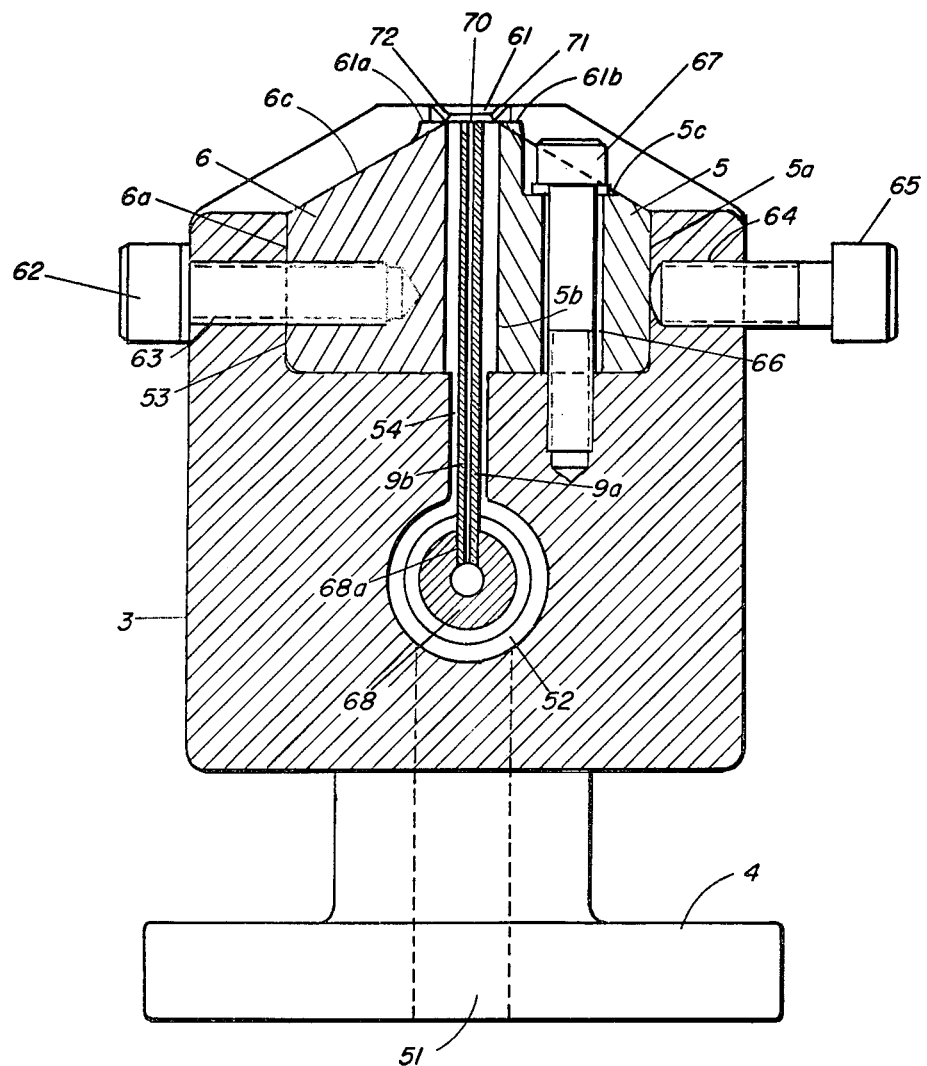
FIG. 3 is a vertical section through the extruder head taken along the line III—III of FIG. 2.
Figure 4:
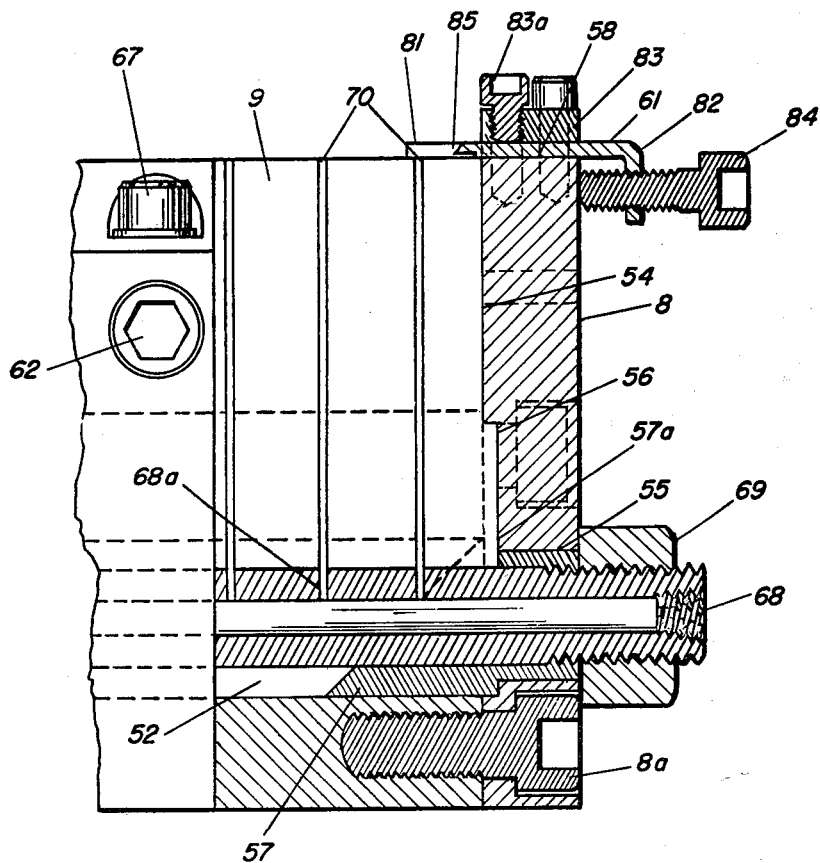
FIG. 4 is a vertical section through the extruder head, taken along the line IV—IV of FIG. 2 with parts in elevation.

As particularly shown in FIG. 3, the outer wall portions 5a and 6a of the respective die lips are drilled at spaced intervals and internally threaded to receive "puller bolts" 62 which are passed through drilled, but unthreaded passageways 63 in the upstanding wall portions of the recess 53. In addition, these wall portions are drilled and threaded to form passageways 64 adapted to receive threaded pusher bolts 65. In the arrangement contemplated these puller and pusher bolts are intended to form an alternating series along each of the wall portions 5a and 6a, whereby the inner wall portions 5b and 6b of the die lips may be individually located with reference to an adjoining edge of the slotted portion 54. In the assembly as illustrated, the inner wall portions of the die provide a variable width extension of the slotted portion 54 in the body portion 3.

Each die lip is also drilled at spaced intervals along its length to provide a series of unthreaded passageways 66 adapted to pass a corresponding series of hold-down bolts or cap screws 67 into threaded engagement in corresponding recesses drilled and threaded in the extruder head body portion 3. The passageways 66 are ovalized on longitudinal axes parallel to the axes of the passageways 63 and 64.

The air blade 9 comprises a pair of flat plate elements, 9a and 9b, of substantially equal thickness having inner and outer surfaces, wherein the inner surfaces have been milled to form a series of transverse semi-circular grooves at regular and equally spaced intervals from end to end whereby, when the two plates are joined with their inner surfaces in sealed juxtaposition, the grooves are paired to form substantially cylindrical passageways 70 through the blade 9 from edge to edge and aligned longitudinally of the blade. The length of the plate elements is determined by the distance of the bottom surfaces of the recesses 56 when the cap plates 7 and 8 are secured to the respective ends of the body portion 3.

In the complete blade, the plates 9a and 9b joined are combined with a hollow cylindrical conduit element 68 by sealed insertion in a radial slot 68a extending therein for a distance intermediate its ends which is substantially equal to that of the lower longitudinal edge portions of the blade plates. Overall, the conduit element 68 has a longitudinal dimension greater than that of the extruder head at the outer surfaces of the cap plates 7 and 8, the ends being threaded to receive nuts such as indicated by the numeral 69 in FIG. 4 with one or both of these ends being adapted for connection to a source of a chilled fluid. The element 68 has an outside diameter substantially less than that of the passageway 52.

In the extruder head assembly shown by the drawings, the air blade 9 is disposed with the conduit element 68 extended through the passageway 52 so as to extend beyond the ends of the head body portion at each end, and outwardly through the respective cap plates 7 and 8, at each end by way of the nipples 57. As thus disposed, the lower longitudinal edge portion of the blade is engaged in the nipple slots 57a and the plate recesses 56. Also, the united blade plate portions extend radially upward through the slotted portion 54 and the space between the opposed inner wall surfaces 5b and 6b of the die lips 5 and 6. With the cap plates 7 and 8 secured to the ends of the extruder head body portion, the nuts 69 are applied to the threaded ends of the conduit element 68 whereby rigidly to secure the air blade unit.

In this assembly, the blade 9 is provided to have an overall thickness, from outer to outer surface, substantially less than the slot 54. As thus disposed, the blade 9 extends upwardly through the slot 54, and between the slot extension provided between the inner surfaces 5b and 6b of the die lip members, to the level of the juncture between these surfaces and the flattened surface portions 61a and 61b. Also, as thus disposed, the opposite surfaces of the blade 9 cooperate with the inner surfaces 5b and 6b to form a spaced pair of die orifices, designated by the numerals 71 and 72 which are connected at opposite ends between the upper end edge portions of the blade and the inner surface of the respective cap plates 7 and 8. The width of these orifices, and thereby the gauge of the thermoplastic material extruded on opposite sides of the blade 9 may be adjusted by means of the puller and pusher studs or bolts 62 and 65 respectively.

Inasmuch as it is intended to produce a lay-flat tube comprising spaced opposed sheet films integrally joined along their longitudinal edges, means are provided for controlling the film gauge along these junctures. Suitable means are provided by deckle plates 61. Each of these plates is formed from a piece of a metal bar stock having a thickness at least equal to the depth of the recesses 58, and having an inner end 81 and an outer end 82. Each of the plates is held in the recesses 58 by means of a clamp 83, secured to the respective upper ends of the cap plates by stud bolts as shown, and a set screw such as indicated at 83a.

The outer end 82 of each deckle plate is bent at right angles to the main body thereof, and is drilled and threaded to receive a spacer bolt 84. The inner end of each plate is notched as at 85 to a form wherein the sides of the notch are flared tangentially from a circular base portion having a radius substantially equal to that of the upper ends of the blade 9, the notch being angularly chamfered along its leg and base portions to a line intermediate the upper and lower plate surfaces. Disposed for use in the assembly, the flared sides of the notch extend angularly beyond the end edges of the air blade plate, with the notch base portion cooperating therewith to provide an adjustable continuance of the orifices, formed between the die lips and the air blade. The exact disposition of the notch with relation to the air blade may be determined by manipulation of the clamp 83, spacer bolts 84, and set screw 83a.

In an operation according to the method contemplated by reference to the apparatus of FIGS. 1 to 4 inclusive, a molten thermoplastic material is discharged through the extruder barrel 2 into the head 1 by way of the conduit 51, and into the passageway 52. Thence, the flow is divided by the fluid conduit element 68, to pass upwardly around the air blade 9 and outwardly from the continuous orifice formed between the air blade 9, die lips 5 and 6, and the deckle plates 61.

The molten material issuing from the orifice as a continuous layered sheet of material is led upwardly between the chill rolls 25 supported above the extruder die head 1, and passed between the nip rolls 41 and 42. A fluid, such as refrigerated air, is introduced through either or both ends of the conduit element 68 to be discharged, by way of the air blade passageways 70, between the layered sheets to maintain a pressure within the extruded tube form sufficient to separate the extruded layers of the thermoplastic material and extend them into surface contact with the rolls 25.

At this time also, the rolls 25 are energized for rotation by means of the motor 29, and the sprocket chain 28, as previously described. Prior to this, the rolls 25 and the nip roll 41 have been brought to an operating temperature by circulation therethrough of a heat exchange fluid, such as water, by way of the respective conduit connections thereto.

Although the invention is particularly contemplated as including means to quench a film as discharged in an amorphous condition from an extruder die, and in which the rolls 25 function as a "chill train," the roller frame structure may be utilized also to reheat or anneal a previously produced film web, or to perform a desired combination of quenching, annealing and heating steps. The train may be divided into chilled and heated sections for any such combination of steps.

In operating according to the method contemplated and illustrated by FIGS. 1 to 4 inclusive the layered tube may be produced so as to have a substantially uniform material gauge throughout by adjusting the die lips and deckle plates with reference to the sides and end edges of the air plate to provide a continuous orifice of substantially uniform width. Alternately, one die lip may be spaced from the air blade at a greater distance than the other, whereby to produce a tube form in which one of the two layers of the material has a heavier gauge than the other. Also, by adjustment of the deckle plate elements the edge portions of the lay-flat tube may be gauged in any manner desired.

In the system described and illustrated with reference to FIGS. 1 to 4 inclusive a preferred use of the roller frame structure is contemplated. Alternative to the combination of roller frame or "chill train" means this frame may be adapted for combination with a conventional tubular die, such a combination is illustrated by FIGS. 5 to 7 inclusive.

In these drawings, the roller frame structure shown by FIG. 1 is illustrated schematically and the numerals 25, 34, 35 and 36 identify parts similar to those shown by FIG. 1.

Referring to these drawings more specifically, the numeral 100 designates an extruder, which may be of any conventional type, supplying a molten thermoplastic material of any appropriate type to extrusion die 102.

The extrusion die 102, as schematically illustrated in FIG. 6, has a circular outlet orifice 103 which produces a tubular film 104 of the thermoplastic material being extruded with a circular cross-section. The die 102 can, for example, be of the type shown in copending application Serial No. 219,469, filed August 27, 1962, and details of the die construction may be had by reference to that application. In addition, the die 102 may also be provided with an internal sizing mandrel 105, as shown in FIG. 5, which is supported from die 102 and is disposed internally of extruded tube 104. For details of the construction of the internal sizing mandrel 105, reference is made to copending application Serial No. 234,147, filed August 30, 1962.

A precision air ring 106 which provides initial cooling of tube 104 by means of an air jet which surrounds the die 102 is provided which exhausts air through the venturi-shaped housing 107, as indicated by the arrows in FIG. 5.

An air ring 108 of any desired type may additionally be provided to surround film 104 with a blast of cooling air at a point adjacent the sizing ring 105.

The tube 107 continues upwardly until it reaches a pair of lower cooling shields 109 and 110 which partially collapse the tube, as indicated in FIG. 5.

The lower cooling shield 110 is shown in more detail in FIG. 7 which additionally illustratees the manner in which tube 104 is flattened out when collapsed by cooling shields 109 and 110. The cooling shields 109 and 110 include input and output conduits 111–112 and 113–114 which cooperate with a source of heat exchange fluid which circulates through hollow shields 109 and 110 to maintain the shields at a low temperature.

Clearly, the internal construction of cooling shields 109 and 110 may be of any desired type with appropriate baffles being utilized to assure uniform distribution of the heat exchange medium.

Thereafter, the flattened tube 104 enters the opposing chill train sections, which may be identical in construction to the roll structure of FIG. 1, and are provided with conduit systems schematically illustrated in single line which have input sections 35 and outlet sections 36.

After the film 104 runs the length of chill train sections 115 and 116, the film is captured by the opposing nip rolls 41 and 42, and is then conducted to other parts of the system. If necessary, a pair of upper cooling shields 121 and 122 may be added in the event that the lower cooling shields 112 and 114 do not choke down sufficiently.

It is to be understood that the roller frame structure may be used for both chilling the extruded film 104 as well as collapsing it, which, in FIGURE 5, is served primarily by the lower cooling shields 109 and 110. By way of example, roller frame sections, supporting the respective series of rollers 25, could be pivotally mounted at their upper ends so that the film-receiving surfaces of the sections taper outwardly. Therefore, as the film rises, it would be both cooled and collapsed by the time it reaches the top of the opposed roll sections.

Although this invention has been described with respect to its preferred embodiments, it should be understood that many variations and modifications will now be obvious to those skilled in the art, and it is preferred, therefore, that the scope of this invention be limited not by this specific disclosure herein but only by the appended claims.

What is claimed is:

1. An apparatus for producing tube-type extruded films of molten thermoplastic materials, comprising an extruder head, including a pair of longitudinally opposed, spaced die lips forming a channel intermediate their opposed side surface portions, an air blade disposed in said channel to extend longitudinally thereof and disposed therein for laterally spaced relation said respective die lip side surface portions, whereby to divide said channel into two parallel portions, said blade terminating at each end in spaced relation to the respective ends of said die lips, means at each end of said die lips, spaced from said air blade, to close said channel ends, and means for defining a passageway between the end portions of said air blade which passageway is continuous with said two parallel portions of said channel.

2. An apparatus according to claim 1, wherein said channel opens between said die lips at each end thereof, and said means for closing said channel ends comprises a pair of end plate elements respectively secured in sealing relationship to said extruder head at each end thereof.

3. An apparatus according to claim 2, wherein said means for defining a passageway between the respective end portions of said air blade, comprises a deckle plate member mounted on each of said end plate elements to extend over the space between said end plate elements and the adjoining end edge of said blade into relatively spaced relation to said blade.

4. An apparatus according to claim 3, wherein said deckle plate comprises a flat plate element including an inner end for disposition into spaced relation to an air blade end, wherein said end defines a notch portion having a substantially circularly formed base section, and a relatively opposed pair of side wall sections in tangential relation to said base section, and in equiangular relation to a vertical plane through the longitudinal axes of said deckle plate.

5. In an apparatus of the character described, and according to claim 11, said blade-like divider element comprising a pair of plate elements secured in fluid tight surface to surface relation, each said plate defining a longitudinal matching series of semi-circular grooves adapted to form cylindrical passageways from edge to edge and in substantially right angular relation to the longitudinal axis of said blade, a relatively narrow lower edge portion on said blade extending the full length thereof, and a relatively wide upper portion on said blade terminating in substantially equidistant spaced relation to each end of said lower portion.

6. In an apparatus of the character described, and according to claim 5 a conduit means adapted to deliver a fluid into said blade passageways, comprising a tubular pipe, said pipe defining a radial slot adapted to receive the lower edge portion of said blade in sealed, fluid-tight relation.

7. In an apparatus of the character described, and according to claim 11, including means for cooling and setting said extruded film, comprising a pair of mounted parallel rail frame members supported at opposite sides of an extruder head, each said rail frame including a pair of laterally opposed vertical rails, a vertical series of horizontal, hollow, rolls having hollow shafts communicating through said rolls and supported in bearings carried by said rails, whereby to dispose said rolls transversely of said frame between said rails, a sprocket on each shaft at one end thereof, and means for rotating all rolls simultaneously and in a uniform direction with tangential relation to a vertical plane intermediate said rail frame members.

8. An apparatus according to claim 7, wherein said means for rotating said rolls, comprises a motor driven sprocket chain extended in a continuous travel path over the outer aspects of the shaft sprockets of the rolls of one frame member, and the inner aspects of the shaft sprockets of the rolls of said other frame member, and including a series of idler sprockets mounted on each frame member intermediate successive pairs of rolls.

9. An apparatus for producing tube-type extruded films of molten thermoplastic materials, comprising an extruder head including a pair of longitudinally opposed, spaced die lips forming a channel intermediate their opposed side surface portions, a relatively thin blade-like divider element, disposed in said channel in laterally spaced relation to said die lip surface portions, defining therewith a pair of parallel orifice portions, deckle plate means at each end of said channel adapted to be disposed in spaced relation to said divider element end edge portions whereby to form a continuation of said orifice portions, means for passing fluid material through the outer longitudinal edge of said blade, a pair of roller support frames disposed in opposed, parallel, spaced relation to each other and to said respective orifices, each said frame including a vertical series of chill rolls rotatable uniformly in a direction substantially tangential to a vertical plane common to said divider element vertical and longitudinal axis, and means for passing fluid heat exchange media through said divider element upper edge portion, and through said rolls.

10. In an apparatus of the character described, and adapted for producing a tube-type extruded film of a thermoplastic material, an extruder head providing a relatively long and narrow die orifice, a relatively thin air blade disposed in said orifice in spaced relation to the walls thereof, means for adjusting the spacing between said die orifice walls and said air blade, means for passing fluid heat exchange media through the upper edge of said air blade, means for cooling and setting said extruded film, comprising a pair of parallel rail-frame members, each said rail frame members including a pair of laterally opposed vertical rails, a vertical series of horizontal, hollow rolls each having a hollow shaft opening into one said roll and supported in bearings carried by said rail frame members, whereby to dispose said rolls transversely of said frame members, between said rails; means for introducing and discharging a heat exchange fluid into and from said rolls through said shafts; drive means for simultaneous rotation of said rolls in each rail frame member on said roll shafts, whereby to rotate the series of rolls on one frame member clockwise, and the series of rolls on the other frame member counter-clockwise, with the opposed aspects of both series of rolls moving in a direction common to the direction of travel of a film web passed between said parallel frame members; and means for adjustably spacing said frame members from one another, laterally to define a travel path for said film web.

11. Apparatus for producing tube-type extruded films of molten thermoplastic materials, comprising an extruder head including a pair of longitudinally opposed, spaced die lips forming a channel intermediate their opposed side surface portions, a relatively thin air blade disposed in said channel in spaced relation to said die lips and opposed side surface portions and defining therewith a die orifice having parallel and elongated side walls, means for passing fluid heat exchange media through the upper edge of said air blade, a pair of roller support frames disposed in opposed, parallel and spaced relation to each other and to the elongated side walls of said die orifice, each said roller support frame including a vertical series of chill rolls rotatable uniformly in a direction substantially tangential to a vertical plane common to the vertical and longitudinal axis of said divider element, and means for passing fluid heat exchange media through said chill rolls.

12. Apparatus as set forth in claim 10 including a pair of cooling shields positioned between the extruder head and said vertical series of rolls, said pair of cooling shields being disposed on opposite sides of said extruded tube and having surfaces engaging said tube and flattening the same inwardly, said cooling shields having internal passages therein for conducting a heat exchange medium.

References Cited by the Examiner

UNITED STATES PATENTS

| | | | |
|---|---|---|---|
| 2,108,753 | 2/1938 | Low | 22—57.5 |
| 2,412,187 | 12/1946 | Wiley et al. | 264—210 |
| 2,544,044 | 3/1951 | Reber et al. | 18—14 X |
| 2,594,842 | 4/1952 | Bailey | 264—95 X |
| 2,900,220 | 8/1959 | Shaw | 264—210 |
| 2,916,053 | 12/1959 | Klasing et al. | 138—128 |
| 2,955,321 | 10/1960 | Fortner et al. | 18—14 X |
| 2,976,567 | 3/1961 | Jones et al. | 264—210 X |
| 3,072,962 | 1/1963 | McDermott et al. | 264—177 |
| 3,095,258 | 6/1963 | Scott | 264—117 |
| 3,104,682 | 9/1963 | Schenk et al. | 138—128 |
| 3,116,194 | 12/1963 | Looser. | |
| 3,118,179 | 1/1964 | Bonner | 18—12 |
| 3,119,150 | 1/1964 | Hungerford | 18—12 |

FOREIGN PATENTS 1,079,430  10/1956  Germany.

J. SPENCER OVERHOLSER, *Primary Examiner.*

ALEXANDER H. BRODMERKEL, MICHAEL U. BRINDISI, WILLIAM J. STEPHENSON,
*Examiners.*